United States Patent
Leonelli (10) Patent No.: US 9,873,240 B2
(45) Date of Patent: Jan. 23, 2018

(54) CONTINUOUS ROTARY HEAT-SEALING MACHINE, PARTICULARLY FOR JOINING HEAT-SEALABLE FILMS OR RIBBONS

(71) Applicant: Ernesto Leonelli, Milan (IT)

(72) Inventor: Ernesto Leonelli, Milan (IT)

(73) Assignee: Ernesto Leonelli, Milan (IT)

( * ) Notice: Subject to any disclaimer, the term of this patent is extended or adjusted under 35 U.S.C. 154(b) by 0 days.

(21) Appl. No.: 14/982,772

(22) Filed: Dec. 29, 2015

(65) Prior Publication Data
US 2016/0185090 A1    Jun. 30, 2016

(30) Foreign Application Priority Data
Dec. 31, 2014  (IT) .............................. MI2014A2291

(51) Int. Cl.
| | |
|---|---|
| *B32B 37/00* | (2006.01) |
| *B32B 37/10* | (2006.01) |
| *B30B 5/06* | (2006.01) |
| *B29C 65/18* | (2006.01) |
| *B29C 65/30* | (2006.01) |

(Continued)

(52) U.S. Cl.
CPC .......... *B32B 37/0046* (2013.01); *B29C 65/18* (2013.01); *B29C 65/30* (2013.01); *B29C 66/1122* (2013.01); *B29C 66/3452* (2013.01); *B29C 66/8161* (2013.01); *B29C 66/8242* (2013.01); *B29C 66/83533* (2013.01); *B29C 66/849* (2013.01); *B30B 5/06* (2013.01); *B32B 37/1027* (2013.01); *B65B 51/306* (2013.01)

(58) Field of Classification Search
CPC ............ B32B 37/0046; B32B 37/1027; B32B 38/0036; B32B 38/004; B32B 37/0053; B30B 5/06; B29C 65/18; B29C 65/30

USPC ................... 156/583.5, 583.8, 556
See application file for complete search history.

(56) References Cited

U.S. PATENT DOCUMENTS 2,492,530 A * 12/1949 Kriegsheim ............ B29C 59/02
                                                                219/767
2,759,308 A *  8/1956 Nawrocki ................. B65B 9/02
                                                                 53/122

(Continued)

FOREIGN PATENT DOCUMENTS

| | | |
|---|---|---|
| GB | 1 531 023 A | 11/1978 |
| JP | 2014-000982 A | 1/2014 |

OTHER PUBLICATIONS

D. Grewell and A. Benatar, "Welding of Plastics: Fundamentals and New Developments", Intern. Polymer Processing XXII, 2007, vol. 1, pp. 43, 48.*

(Continued)

*Primary Examiner* — Philip C Tucker
*Assistant Examiner* — Jim R Smith
(74) *Attorney, Agent, or Firm* — Scully, Scott, Murphy & Presser, P.C.

(57) ABSTRACT

A continuous rotary heat-sealing machine, particularly for joining heat-sealable films, papers or ribbons, which comprises a frame provided with at least one first pair of rotating shafts and at least one second pair of rotating shafts, the machine comprising at least one pair of tracks, each one mounted on a shaft of the first pair of rotating shafts and on a shaft of the second pair of rotating shafts, the tracks being arranged substantially in contact with each other, rotating in opposite directions, and being adapted to create a pressure plane.

8 Claims, 7 Drawing Sheets

(51) Int. Cl.
B29C 65/00 (2006.01)
B65B 51/30 (2006.01)

(56) References Cited

U.S. PATENT DOCUMENTS

| | | | |
|---|---|---|---|
| 3,475,257 A | 10/1969 | Ludwig et al. | |
| 3,549,462 A * | 12/1970 | Hollis | B29C 65/18 156/290 |
| 3,660,189 A | 5/1972 | Troy | |
| 4,923,560 A * | 5/1990 | Inselmann | A41H 43/04 100/154 |
| 5,900,090 A * | 5/1999 | Distefano | B65H 19/1852 156/159 |
| 6,174,102 B1 * | 1/2001 | Do | B23Q 1/282 269/71 |
| 2011/0303360 A1 * | 12/2011 | Xu | A61F 13/15739 156/308.2 |

OTHER PUBLICATIONS

Italian Search Report dated Aug. 17, 2015 issued in Italian Patent Application No. IT MI20142291, together with English Language Translation.

* cited by examiner

Fig. 6

CONTINUOUS ROTARY HEAT-SEALING MACHINE, PARTICULARLY FOR JOINING HEAT-SEALABLE FILMS OR RIBBONS

The present invention relates to a continuous rotary heat-sealing machine, particularly for joining heat-sealable films or ribbons. The continuous rotary heat-sealing machine described herein is particularly, although not exclusively, adapted and practical for coupling two or more films or ribbons or layers of materials that are similar to or different from each other, such coupling being hot, or even cold, or involving the spreading of one or more adhesive layers.

Currently, in order to join two or more heat-sealable films or ribbons, i.e. in order to perform the coupling thereof, separate heated rollers are used, also known as calenders, which take the starting films as their input and give, as output, often continuously, a multilayer film resulting from the joining of the input films.

These conventional calenders are constituted by a pair of heated rollers arranged substantially in contact with each other, one of which rotates clockwise and the other anticlockwise, both supported and actuated by a mechanical structure of various type which enables the rotation thereof; the first roller, usually the lower one, is in a fixed position, while the second roller, usually the upper one, can move vertically, for example actuated by way of pneumatic actuators, and as a consequence is capable of exerting a variable pressure on the lower roller and therefore on the starting films entering between the two rollers.

Such conventional separate heated rollers are not devoid of drawbacks, among which is the fact that the time available to the films for coupling purposes is limited to the contact time between the two rollers, which have a single point of contact, i.e. a linear contact surface, thus resulting in a very short coupling time and one that is inversely proportional to the rotation speed of the rollers.

Therefore, as the rotation speed of conventional separate heated rollers increases, the time available to the material for coupling or heat-sealing decreases, effectively limiting the resulting production of multilayer film or pouch or in any case reducing the quality thereof.

Another disadvantage of conventional separate heated rollers consists in that they make it very difficult to control the time available for coupling, or more generally for joining, the starting films, in this case too owing to the single point of contact, i.e. a linear contact surface, between the rollers proper.

A further disadvantage of conventional separate heated rollers consists in that they present an excessive risk of overheating, in particular of the coating of such rollers, which can result in the burning of the material used.

The aim of the present invention is to overcome the limitations of the known art described above, by devising a continuous rotary heat-sealing machine, particularly for joining heat-sealable films, papers or ribbons and pouches that makes it possible to obtain similar or superior results with respect to those obtainable with conventional machines, by making it possible to substantially increase the contact surface for coupling with respect to conventional separate heated rollers.

Within this aim, an object of the present invention is to devise a continuous rotary heat-sealing machine, particularly for joining heat-sealable films or ribbons, that makes it possible to increase the contact time, i.e. the time available to the films in the heat-sealing machine for the purposes of coupling.

Another object of the present invention is to devise a continuous rotary heat-sealing machine, particularly for joining heat-sealable films, papers or ribbons, that makes it possible to control and adjust the time available for coupling, or more generally for joining, the starting films.

Another object of the present invention is to provide a continuous rotary heat-sealing machine, particularly for joining heat-sealable films, papers or ribbons, that is highly reliable, easily and practically implemented and low cost.

This aim and these and other objects which will become better apparent hereinafter are achieved by a continuous rotary heat-sealing machine, particularly for joining heat-sealable films, papers or ribbons, which comprises a frame provided with at least one first pair of rotating shafts and at least one second pair of rotating shafts, characterized in that it comprises at least one pair of tracks, each one mounted on a shaft of said first pair of rotating shafts and on a shaft of said second pair of rotating shafts, said tracks being arranged substantially in contact with each other, rotating in opposite directions, and being adapted to create a pressure plane.

Further characteristics and advantages of the invention will become better apparent from the detailed description of a preferred, but not exclusive, embodiment of the continuous rotary heat-sealing machine, particularly for joining heat-sealable films, papers or ribbons, according to the invention, which is illustrated by way of non-limiting example in the accompanying drawings, wherein.

Figure 1:
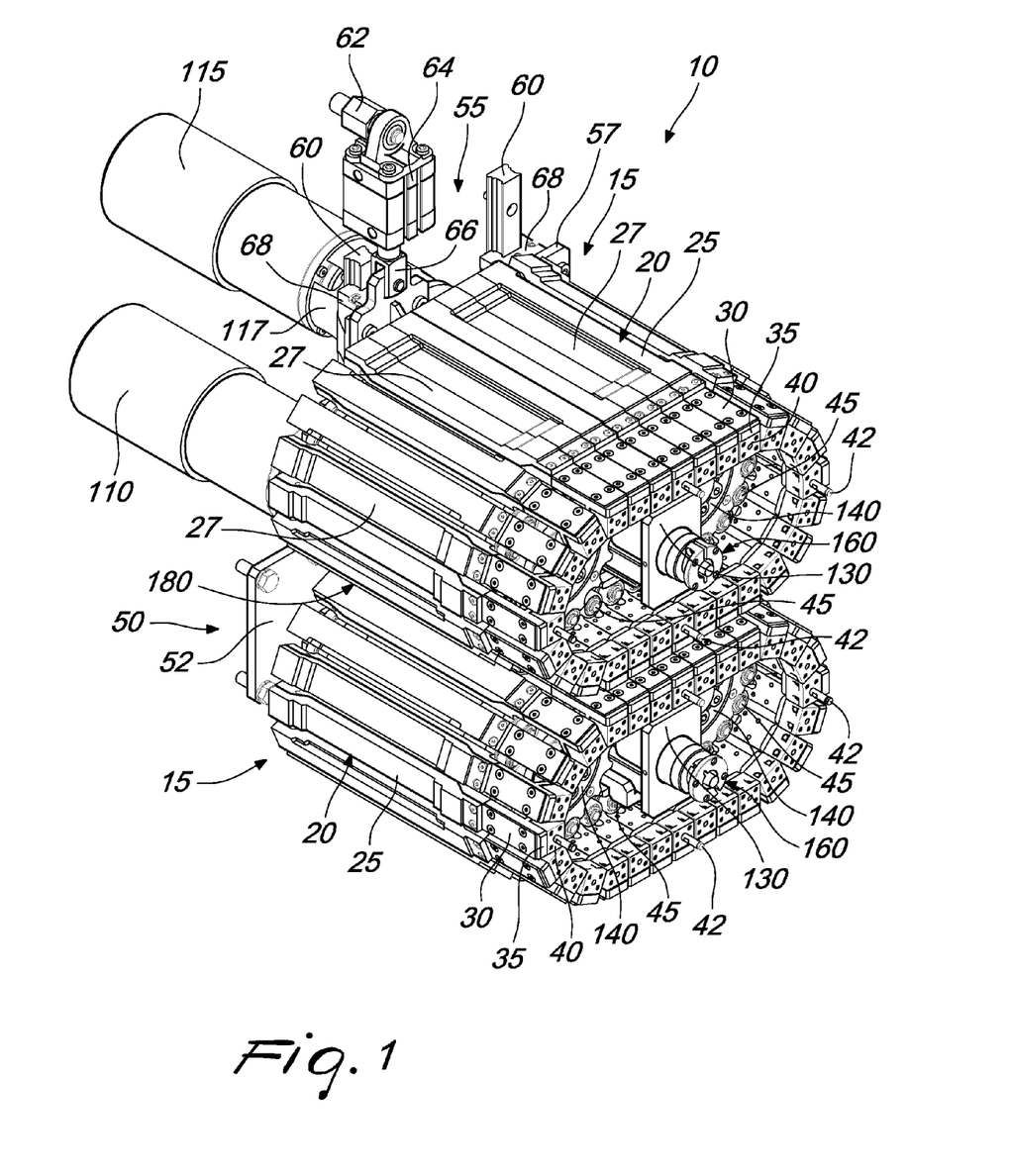
FIG. 1 is a perspective view from above of a preferred embodiment of a continuous rotary heat-sealing machine, particularly for joining heat-sealable films, papers or ribbons, according to the invention.
Figure 2:
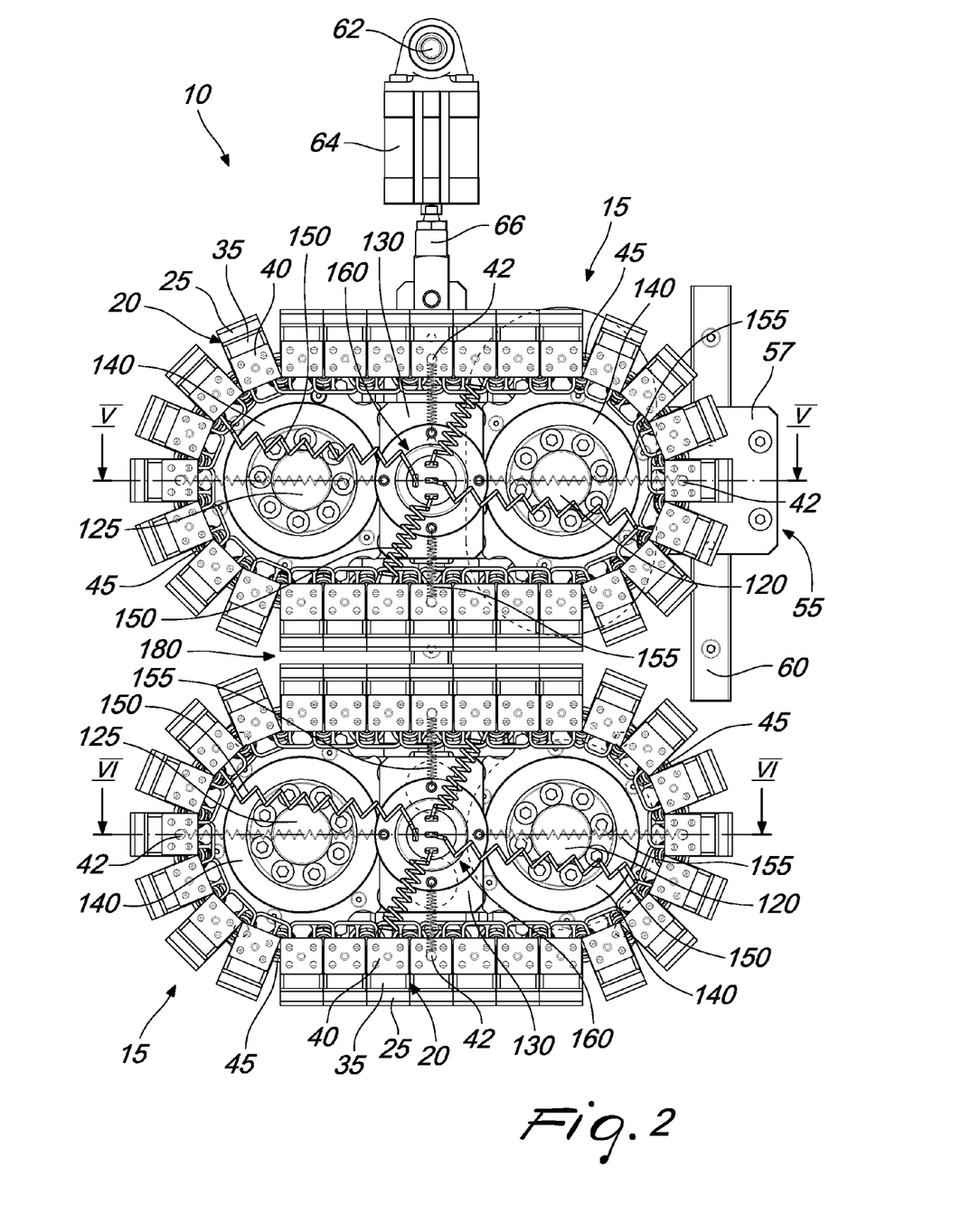
FIG. 2 is a front elevation view of the embodiment of the continuous rotary heat-sealing machine, particularly for joining heat-sealable films, papers or ribbons, shown in FIG. 1.
Figure 3:
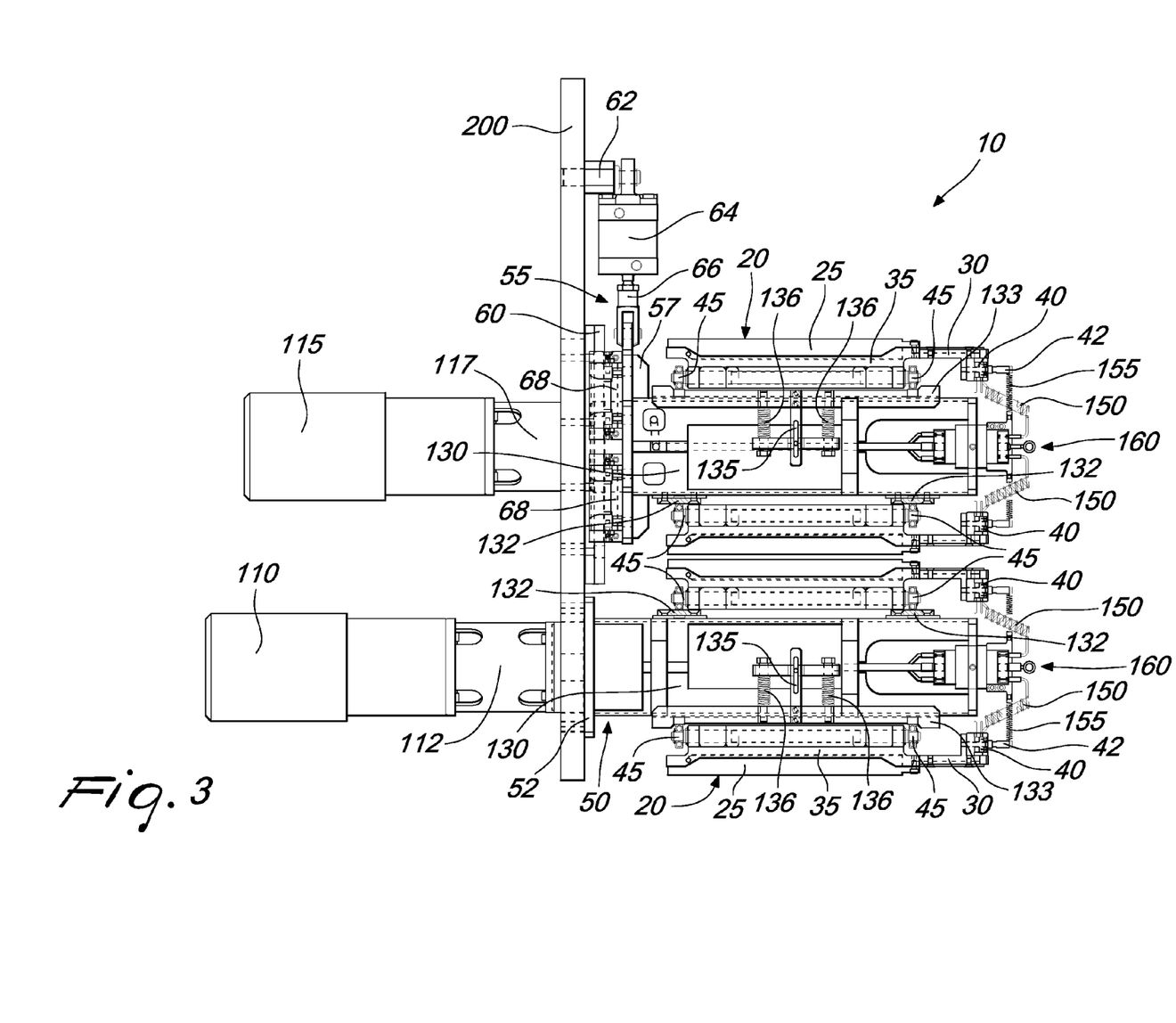
FIG. 3 is a cross-sectional view of the embodiment of the continuous rotary heat-sealing machine, particularly for joining heat-sealable films, papers or ribbons, shown in FIG. 1.
Figure 3A:
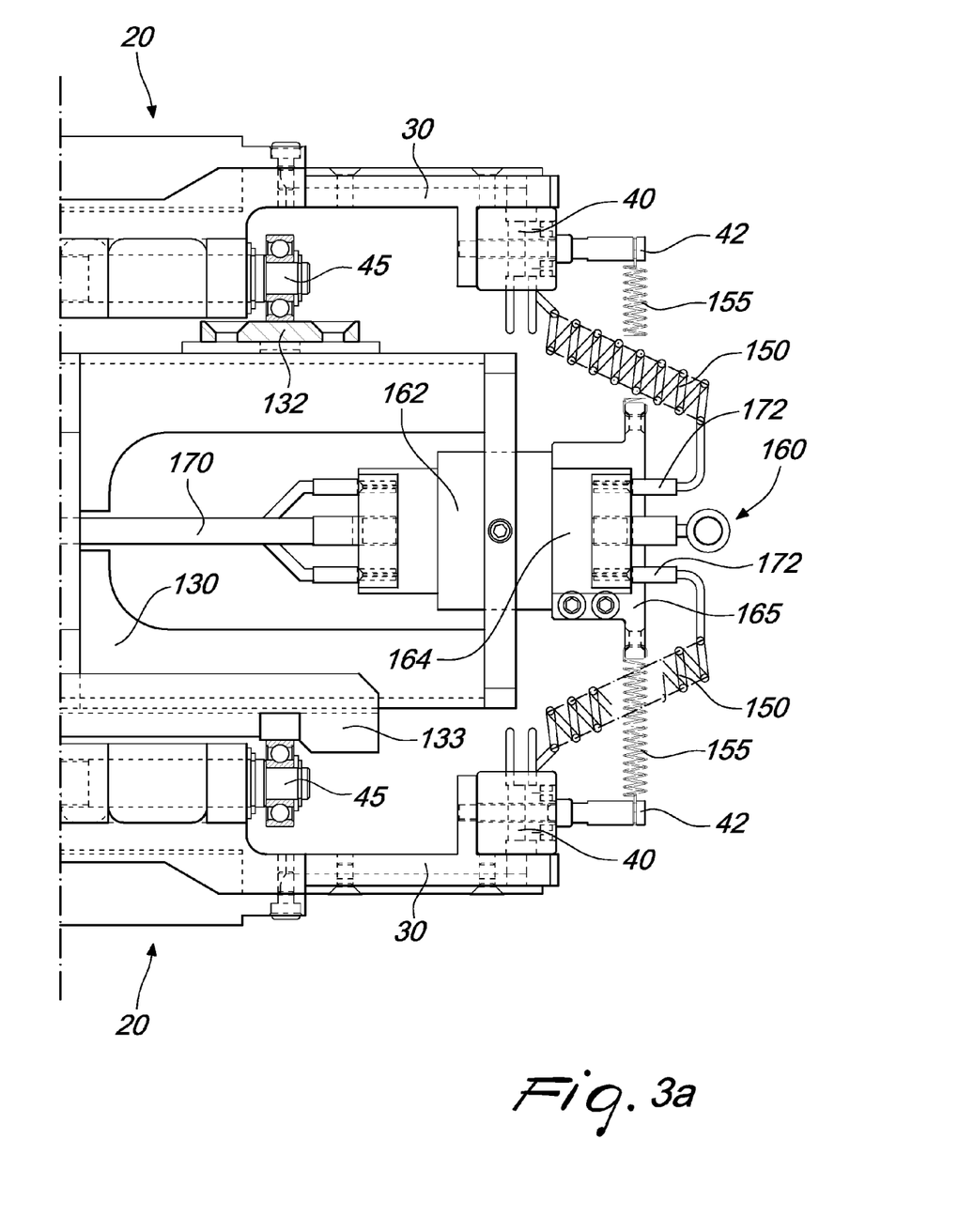
FIG. 3a is a cross-sectional view of a detail of the embodiment of the continuous rotary heat-sealing machine, particularly for joining heat-sealable films, papers or ribbons, shown in FIG. 3.
Figure 4:
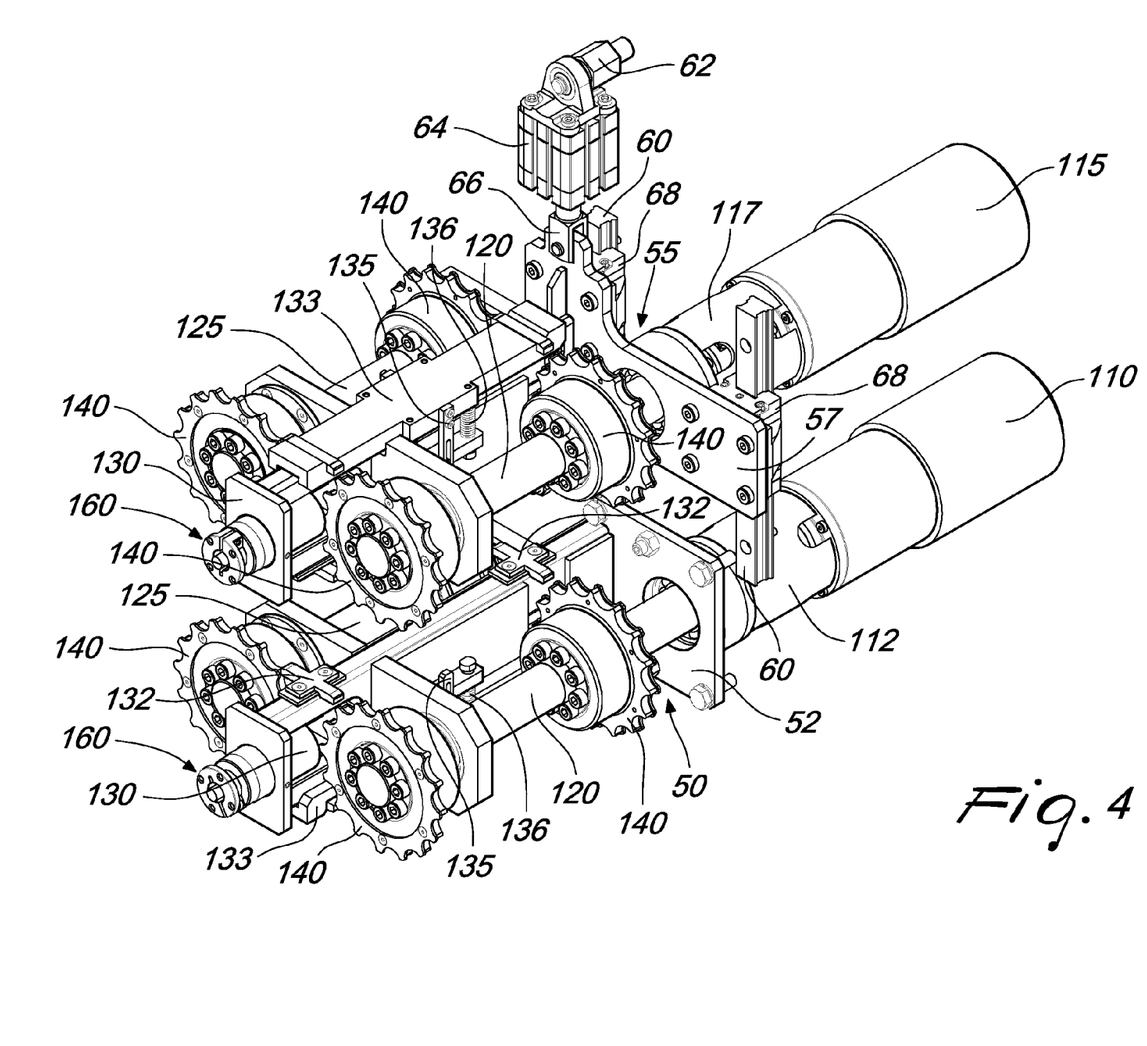
FIG. 4 is a perspective view from above of the frame and the motors of an embodiment of the continuous rotary heat-sealing machine, particularly for joining heat-sealable films, papers or ribbons, according to the invention.
Figure 5:
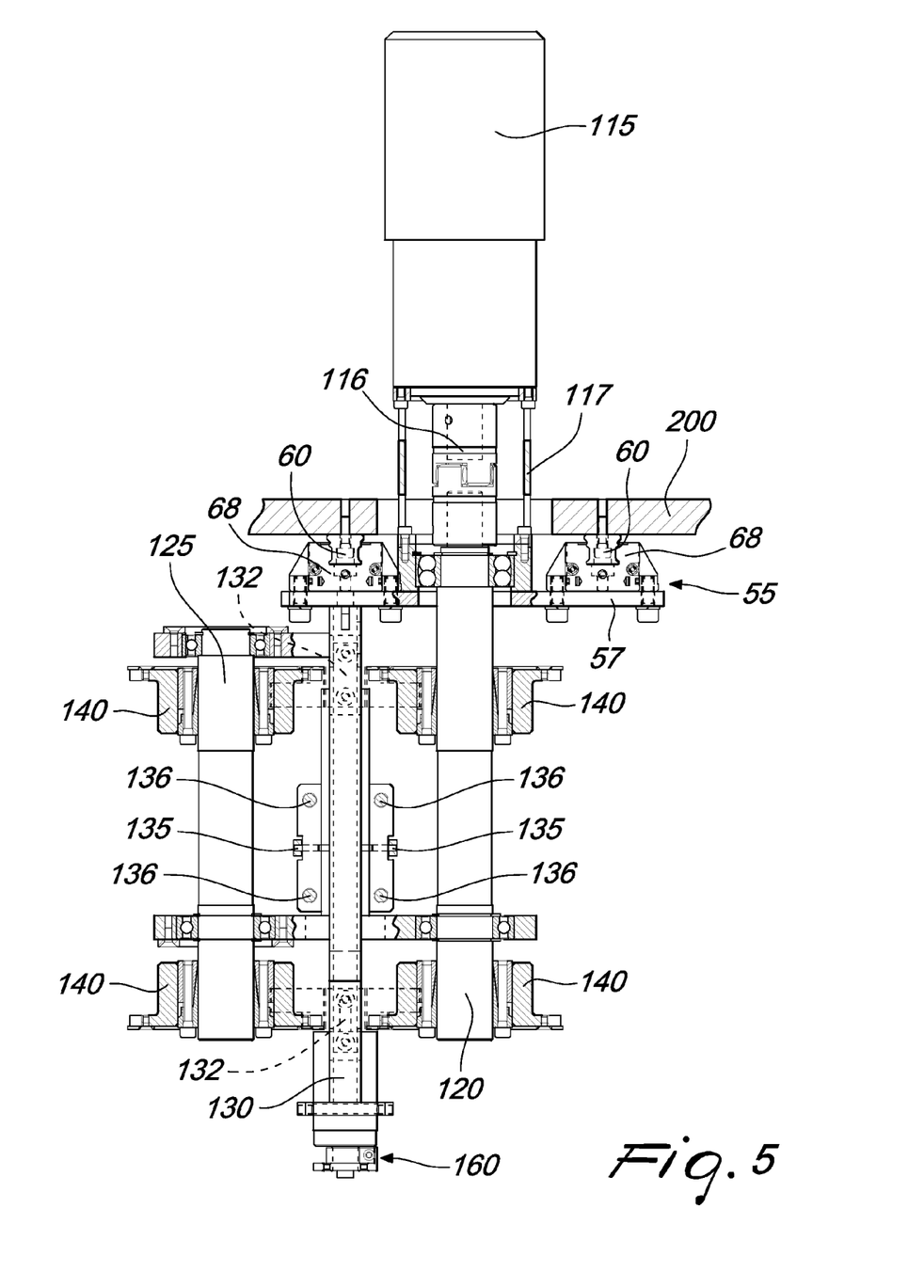
FIG. 5 is a first cross-sectional view of the frame and of the motors of the embodiment of the continuous rotary heat-sealing machine, particularly for joining heat-sealable films, papers or ribbons, shown in FIG. 4.
Figure 6:
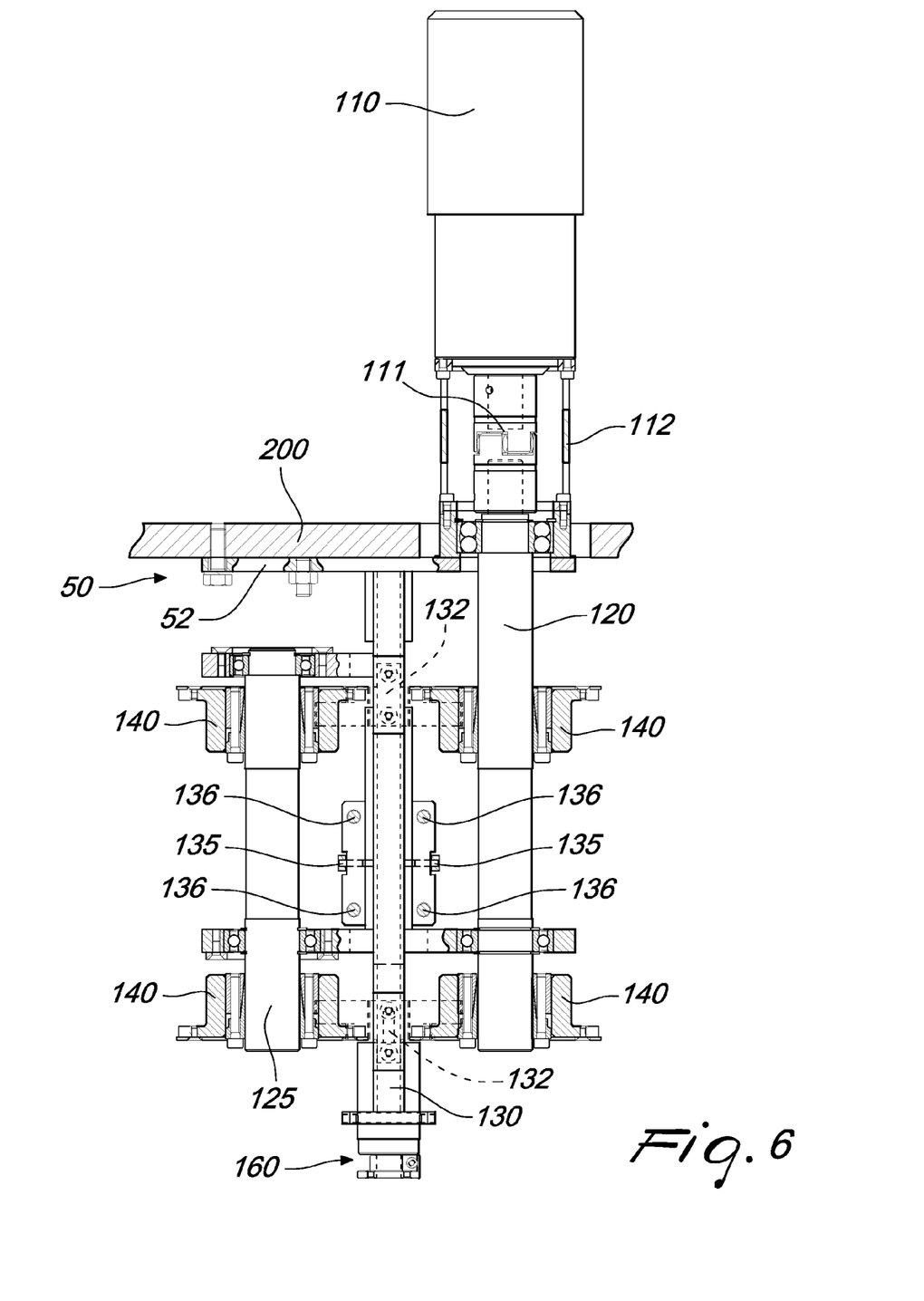
FIG. 6 is a second cross-sectional view of the frame and of the motors of the embodiment of the continuous rotary heat-sealing machine, particularly for joining heat-sealable films, papers or ribbons, shown in FIG. 4.

With reference to the figures, the continuous rotary heat-sealing machine, particularly for joining heat-sealable films, papers or ribbons, according to the invention, generally designated by the reference numeral 10, comprises a pair of substantially mutually identical tracks 15, such tracks 15 being supported by a frame that comprises a fixed lower part 50 and a moveable upper part 55, and being actuated by a pair of motors 110 and 115.

The tracks 15 are positioned one over the other and substantially in contact with each other, rotating in opposite directions, i.e. one clockwise and the other anticlockwise. They are flexible and non-extensible and are made up of a determined number (for example twenty-eight, as in the embodiment shown) of sectors 20 joined together, by way of bearings 45, in the shape of a closed ring band.

Fixed on the upper surface of each one of the sectors 20 is a slider or matrix 25, which is preferably screwed on top of an adapted support 35. The support 35 also acts as an element for joining with the bearings 45, which are fixed below the support 35 proper, and therefore below the sector 20. Each sector 20 comprises further a plate 30 and a terminal 40.

In a preferred embodiment of the continuous rotary heat-sealing machine 10, the sliders 25 of the sectors 20 which constitute the tracks 15 are conveniently contoured so as to create, on the exposed surface thereof, a recess 27 adapted to accommodate any item or product to be packaged and sealed within the heat-sealable films or ribbons to be joined.

The dimensions of the recess 27, and in particular its extension and its depth, can vary as a function of the size of the items or products to be packaged and sealed by way of the continuous rotary heat-sealing machine 10.

The tracks 15, thanks to the action of the bearings 45 on the sectors 20, are in any case flexible and are therefore free to rotate about the axles of the frame 50 and 55, thus making it possible to create a flat portion within the area of substantial contact between the lower track 15 and the upper track 15, such flat portion in practice forming the pressure plane 180 of the continuous rotary heat-sealing machine 10.

The flat portion that runs along the sectors 20 and the corresponding sliders 25, i.e. the pressure plane 180, is the portion of the tracks 15 where the coupling or joining occurs of the films entering the continuous rotary heat-sealing machine 10, preferably by way of heating by thermal conduction, generated by adapted resistances, for example heating elements, powered by electricity originating from an electricity cabinet, and/or through the spreading in advance of one or more adhesive layers.

The pressure exerted by the two tracks 15 on the pressure plane 180 is adjustable thanks to the frame, which as previously mentioned comprises a fixed lower part 50, which supports the lower track 15, and a moveable upper part 55, which supports the upper track 15.

In particular, the upper frame 55 can move vertically, or more generally linearly, as a consequence making it possible for the upper track 15 to exert a variable pressure on the lower track 15 and therefore on the films entering the machine between the two tracks 15.

The upper frame 55 comprises a plate 57, preferably made of steel or other high-strength metal, which is coupled rigidly, for example by way of bolts or screws, to slider elements 68. These latter items, and consequently the plate 57 or more generally the upper frame 55, slide vertically along the guiding supports 60 which are coupled rigidly to a supporting structure 200, to which the continuous rotary heat-sealing machine 10 is globally fixed, for example by way of bolts or screws.

The vertical, or more generally linear, mobility of the upper frame 55 is preferably controlled by way of a pneumatic actuator or roller 64 which actuates a fork 66 coupled to the plate 57 of the upper frame 55, the roller 64 being rigidly coupled, by way of an adapted pin 62, to the supporting structure 200.

The lower frame 50 on the other hand comprises a plate 52, preferably made of steel or other high-strength metal and rigidly coupled to the supporting structure 200, for example by way of bolts or screws.

Furthermore, both the fixed lower frame 50 and the moveable upper frame 55 comprise axles on which the tracks 15 are fitted, such axles being adapted to transmit the rotary motion of the motors 110 and 115 to the tracks 15, and also to support such tracks 15 and guide them during their rotary motion.

In particular, each of the frames 50 and 55 comprise a driving shaft or transmission axle 120, a driven shaft or driven axle 125, and a guiding axle 130. The driving shaft 120 is associated with the corresponding motor 110 or 115, while the driven shaft 125 and the guiding axle 130 are coupled to the plate 52 or 57 of the frame.

In practice, the continuous rotary heat-sealing machine 10 is provided with a first pair of rotating shafts, which is constituted by the driving shafts 120, the lower shaft associated with the motor 110 and the upper shaft associated with the motor 115, a second pair of rotating shafts, which is constituted by the driven shafts 125, the lower shaft coupled to the plate 52 of the corresponding frame 50 and the upper shaft coupled to the plate 57 of the corresponding frame 55, and a pair of guiding axles 130, the lower axle coupled to the plate 52 of the corresponding frame 50 and the upper axle coupled to the plate 57 of the corresponding frame 55.

The driving shaft 120, which is preferably made of steel or other high-strength metal, is adapted to transmit the rotary motion generated by the corresponding motor 110 or 115 to the tracks 15 and, to this end, it comprises a ring gear or sprocket 140, preferably made of steel and fixed by way of bolts or screws, arranged at both of its ends, which acts on the chain of bearings 45 which connect the different sectors 20 of the tracks 15. The driving shaft 120 is associated with the corresponding motor 110 or 115 by way of a universal joint 111 or 116.

Each one of the tracks 15 is therefore actuated by a corresponding motor, which enables the rotation thereof; in particular, the lower track 15 is actuated by the motor 110, associated with the driving shaft 120 by way of the universal joint 111 and coupled to the plate 52 of the fixed lower frame 50 or to the supporting structure 200 by way of a support 112, while the upper track 15 is actuated by the motor 115, associated with the driving shaft 120 by way of the universal joint 116 and coupled to the plate 57 of the moveable upper frame 55 or to the supporting structure 200 by way of a support 117.

The driven shaft 125, which is preferably made of steel or other high-strength metal and coupled to the plate 52 or 57, is adapted to maintain the tensioning of the tracks 15 and, to this end, it also comprises a ring gear or sprocket 140, preferably made of steel and fixed by way of bolts or screws, arranged at both of its ends, which acts on the chain of bearings 45 which connect the different sectors 20 of the tracks 15. The driven shaft 125 effectively performs a passive function with respect to the driving shaft 120, in that it is not associated with any motor and it is subjected to the rotary motion transmitted by the driving shaft 120.

The guiding axle 130, coupled to the plate 52 or 57, is adapted to guide and control the tracks 15 during their rotary motion and, to this end, it comprises both guides 132 for controlling the chain of bearings 45, and guides 135 and springs 136, both connected to a plate 133, for controlling the sectors 20, in particular of the corresponding supports 35. The guiding axle 130, furthermore, is adapted to support, by way of a pair of lateral wings, the corresponding driving shaft 120 and driven shaft 125.

Furthermore, the electricity needed to heat the resistances, for example heating elements, of the tracks 15 is supplied through the guiding axle 130.

To this end, the guiding axle 130 comprises, at its opposite end with respect to the frame of the continuous rotary heat-sealing machine 10, an electrical contact 160, made up substantially of two parts: a fixed part 162 and a rotating part 164.

The electrical contact 160 has, therefore, a fixed part 162, which is locked on the guiding axle 130, and a rotating part 164, which rotates as a consequence of the rotation of the track 15 of the continuous rotary heat-sealing machine 10.

In particular, in order to ensure the rotation of the rotating part 164 of the contact 160, the continuous rotary heat-sealing machine 10 is provided with springs 155 (for example four in number), which are connected at one end to corresponding equidistant pins 42, fixed to the tracks 15 and in particular fixed to some sectors 20, and at the other end to a disk 165, fixed to the rotating part 164 of the contact 160 and provided with holes in which to hook the springs 155; the disk 165 thus enables the rotation of the rotating part 164 of the contact 160 together with the continuous rotary heat-sealing machine 10, so that the sprung electrical cables 150 do not mutually overlap and/or braid.

The power supply line 170, preferably 230 V, of the resistances that heat the sectors 20 and the corresponding sliders 25 of the tracks 15 of the continuous rotary heat-sealing machine 10, is connected in input to the fixed part 162 of the contact 160, passing through the guiding axle 130, which is internally hollow.

By contrast, the rotating part 164 of the contact 160 has input and/or output electrical connections 172, based on the number of sprung electrical cables 150 comprised in the continuous rotary heat-sealing machine 10.

The sectors 20 of the tracks 15 of the continuous rotary heat-sealing machine 10 have a seat inside them for the resistances, which is provided with a pair of output cables: one for phase and one for neutral.

For example, in the embodiment shown, the resistances inside the sectors 20 of the tracks 15 are a total of twenty-eight in number, one for each sector 20; such resistances, for the purposes of their electric power supply, can be divided into three sections (two sections of nine resistances and one section of ten resistances).

The resistances of the sectors 20 are mutually connected by way of bridges, which are provided by way of terminals 40 and electrical cables; furthermore a sprung electric cable 150 exits from one of the terminals 40 of each cross-section and is connected to the rotating part 164 of the contact 160.

In particular, the function of the sprung electric cable 150 is to adapt to the distance between the electrical contact 160 and the track 15, which constantly varies during the rotation deriving from the operation of the continuous rotary heat-sealing machine 10.

The resistances of the sectors 20 are further connected to the neutral, again by way of bridges, and one of the terminals 40 of such bridges will have a sprung electric cable 150 in output toward the rotating part 164 of the contact 160.

In the embodiment of the continuous rotary heat-sealing machine 10 shown here, there are in total four sprung electrical cables 150: one sprung cable 150 for each one of the three sections of resistances of the sectors 20, and a single sprung cable 150 for the connection to the neutral.

The control of the resistances inside the sectors 20, and therefore the control of the temperature of the tracks 15, is entrusted to a system outside the continuous rotary heat-sealing machine 10, such as for example a radar gun adapted to measure the temperature.

For controlling the temperature, an alternative to the radar gun is to use a resistance that is provided internally with adapted means for controlling the minimum and maximum temperature, such means being connected to the rotating part 164 of the contact 160.

Obviously, the connection for supplying electricity to the resistances that heat the sectors 20 and the corresponding sliders 25 of the tracks 15 of the continuous rotary heat-sealing machine 10, described above, is applied both to the moveable upper part 55 and to the fixed lower part 50 of the frame of the continuous rotary heat-sealing machine 10. Note that the continuous rotary heat-sealing machine 10 according to the invention is usually inserted inside a machine or a more complex system, of which the supporting structure 200 is part, in which both the starting films and the resulting multilayer film are transported with adapted conveyor systems. In such case, the continuous rotary heat-sealing machine 10 must consequently synchronize with the processing speed of the machine or of the system, and, for ribbons supplied in input with figures printed on the outside, account must be taken of the spacing with the product inserted inside the pouch.

In practice it has been found that the invention fully achieves the set aim and objects. In particular, it has been seen that the continuous rotary heat-sealing machine, particularly for joining heat-sealable films or ribbons, thus conceived makes it possible to overcome the qualitative limitations of the known art, in that it makes it possible to substantially increase the contact surface for coupling with respect to conventional separate heated rollers or calenders, basically by having a broad pressure plane, within which the coupling or joining of the films occurs.

Another advantage of the continuous rotary heat-sealing machine thus conceived consists in that it makes it possible to increase the contact time, i.e. the time available to the films in the heat-sealing machine for the purposes of coupling.

Another advantage of the continuous rotary heat-sealing machine thus conceived consists in that, thanks to it, it is possible to couple, or more generally join, the starting films uninterruptedly for a sufficiently long surface portion to make it possible to control and adjust the time available for coupling, or more generally for joining, the starting films that pass between the upper track and the lower track.

Furthermore the continuous rotary heat-sealing machine thus conceived has the advantage that the contact time is adjustable independently of the advancement speed of the machine or of the system in which the continuous rotary heat-sealing machine proper is inserted, it thus being able to be adapted to any speed, in that the contact time in the continuous rotary heat-sealing machine is a function of the length of the pressure plane, i.e. of the number of sliders specified at the design stage, the time available for the coupling no longer posing a limitation on production.

Although the continuous rotary heat-sealing machine, according to the invention, has been devised in particular for joining and/or coupling heat-sealable films or ribbons, it can also be used, more generally, for joining and/or coupling any type of heat-sealable material in film, ribbon, or sheet format.

The invention, thus conceived, is susceptible of numerous modifications and variations, all of which are within the scope of the appended claims. Moreover, all the details may be substituted by other, technically equivalent elements.

In practice the materials employed, and the contingent dimensions and shapes, may be any according to requirements and to the state of the art.

In conclusion, the scope of protection of the claims shall not be limited by the explanations or by the preferred embodiments illustrated in the specification by way of examples, but rather the claims shall comprise all the patentable characteristics of novelty that reside in the present invention, including all the characteristics that would be considered as equivalent by the person skilled in the art.

The disclosures in Italian Patent Application No. MI2014A002291 (102014902319864) from which this application claims priority are incorporated herein by reference.

What is claimed is:

1. A continuous rotary heat-sealing machine comprising:
    a frame provided with at least one first pair of rotating shafts and at least one second pair of rotating shafts;
    at least one pair of tracks, each one mounted on a shaft of said first pair of rotating shafts and on a shaft of said second pair of rotating shafts, said tracks being arranged substantially in contact with each other, rotating in opposite directions, and being adapted to create a pressure plane;
    heating elements provided to heat the tracks that define said pressure plane; and
    at least one guiding axle configured to control at least one track of said pair of tracks on rotation, said guiding axle comprising an electrical contact made up of a fixed part and a rotating part, the fixed part being locked on said guiding axle and the rotating part configured to rotate as the at least one track rotates, wherein said tracks comprise sectors which are mutually joined by way of a chain of bearings, said sectors having, on the upper surface, a slider which is fixed to a support, wherein said at least one guiding axle is adapted to control at least one track of said pair of tracks during the rotary motion of said pair of tracks and wherein said at least one guiding axle comprises guides and springs, both connected to a plate, in order to control said sectors of said at least one track.

2. The continuous rotary heat-sealing machine according to claim 1, wherein said sliders comprise a recess adapted to accommodate an item or product to be packaged and sealed within said heat-sealable films or ribbons.

3. The continuous rotary heat-sealing machine according to claim 1, wherein a portion of said frame can move linearly, allowing a first track of said pair of tracks, supported by said movable frame, to apply a variable pressure to a second track of said pair of tracks, which is supported by a fixed portion of said fixed frame.

4. The continuous rotary heat-sealing machine according to claim 3, wherein said movable frame comprises slider elements which are coupled rigidly to a plate, said slider elements sliding linearly along guiding supports.

5. The continuous rotary heat-sealing machine according to claim 4, wherein said movable frame comprises a pneumatic actuator adapted to actuate a fork which is coupled to said plate.

6. The continuous rotary heat-sealing machine according to claim 1, wherein said at least one guiding axle further comprises guides for controlling said chain of said bearings of said at least one track.

7. The continuous rotary heat-sealing machine according to claim 1, wherein said first pair of rotating shafts and/or said second pair of rotating shafts comprise at least one ring gear adapted to act on said chain of said bearings.

8. A continuous rotary heat-sealing machine comprising:
    a frame provided with at least one first pair of rotating shafts and at least one second pair of rotating shafts;
    at least one pair of tracks, each one mounted on a shaft of said first pair of rotating shafts and on a shaft of said second pair of rotating shafts, said tracks being arranged substantially in contact with each other, rotating in opposite directions, and being adapted to create a pressure plane;
    heating elements provided to heat the tracks that define said pressure plane; and
    at least one guiding axle configured to control at least one track of said pair of tracks on rotation, said guiding axle comprising an electrical contact made up of a fixed part and a rotating part, the fixed part being locked on said guiding axle and the rotating part configured to rotate as the at least one track rotates, wherein said tracks comprise sectors which are mutually joined by way of a chain of bearings, said sectors having, on the upper surface, a slider which is fixed to a support, wherein said at least one guiding axle is adapted to control at least one track of said pair of tracks during the rotary motion of said pair of tracks, and wherein said at least one guiding axle comprises guides for controlling said chain of said bearings of said at least one track.

* * * * *